(12) United States Patent
Zimmermann (10) Patent No.: US 9,416,056 B2
(45) Date of Patent: Aug. 16, 2016

(54) ISOLATED PSEUDOBROOKITE PHASE COMPOSITES AND METHODS OF MAKING

(71) Applicant: Corning Incorporated, Corning, NY (US)

(72) Inventor: James William Zimmermann, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/704,165

(22) Filed: May 5, 2015

(65) Prior Publication Data

US 2015/0344373 A1    Dec. 3, 2015

Related U.S. Application Data

(60) Provisional application No. 62/005,023, filed on May 30, 2014.

(51) Int. Cl.
| | |
|---|---|
| *B28B 1/00* | (2006.01) |
| *B28B 5/00* | (2006.01) |
| *C04B 35/64* | (2006.01) |
| *C04B 35/465* | (2006.01) |
| *C04B 35/478* | (2006.01) |
| *C04B 35/66* | (2006.01) |

(52) U.S. Cl.
CPC .............. *C04B 35/64* (2013.01); *C04B 35/465* (2013.01); *C04B 35/478* (2013.01); *C04B 35/66* (2013.01); *C04B 2235/3206* (2013.01); *C04B 2235/3213* (2013.01); *C04B 2235/3222* (2013.01); *C04B 2235/3234* (2013.01); *C04B 2235/3236* (2013.01); *C04B 2235/3272* (2013.01); *C04B 2235/349* (2013.01); *C04B 2235/3418* (2013.01); *C04B 2235/3481* (2013.01); *C04B 2235/36* (2013.01); *C04B 2235/5436* (2013.01); *C04B 2235/5472* (2013.01); *C04B 2235/6567* (2013.01); *C04B 2235/76* (2013.01); *C04B 2235/78* (2013.01); *C04B 2235/80* (2013.01); *C04B 2235/85* (2013.01); *C04B 2235/9607* (2013.01)

(58) Field of Classification Search
CPC ....... B32B 3/12; B01J 35/04; B29K 2105/04; C04B 35/195
USPC ................. 428/116, 304.4; 264/630, 631
See application file for complete search history.

(56) References Cited

U.S. PATENT DOCUMENTS

| | | | |
|---|---|---|---|
| 3,531,307 | A | 9/1970 | Rubin et al. |
| 7,960,009 | B2 | 6/2011 | Backhaus-Ricoult et al. |

(Continued)

OTHER PUBLICATIONS

J. Homeny, D. Lewis, R. W. Rice, T. Garino: "Particulate Toughening in the MgAl2O 4-xTiO2 System"; "Composites, Impact, Statistics, and High-Temperature Phenomena" In: R. C. Bradt, A. G. Evans, D.P. H. Hasselman, F. F. Lange: "Fracture Mechanics of Ceramics", 1986, vol. 7, pp. 117-126.

(Continued)

*Primary Examiner* — Noah Wiese
(74) *Attorney, Agent, or Firm* — John L. Haack (57) ABSTRACT

A sintered refractory ceramic composition including:
a pseudobrookite structured discrete first phase; and
a continuous second phase, as defined herein.
Also disclosed is a method of making the sintered refractory ceramic composition.

18 Claims, 8 Drawing Sheets

(56) References Cited

U.S. PATENT DOCUMENTS

| | | |
|---|---|---|
| 8,383,534 B2 | 2/2013 | Tohma et al. |
| 8,394,167 B2 | 3/2013 | Merkel et al. |
| 2009/0220733 A1* | 9/2009 | Backhaus-Ricoult ........ C04B 35/195 428/116 |
| 2009/0220734 A1* | 9/2009 | Backhaus-Ricoult ........ C04B 35/478 428/116 |
| 2010/0237007 A1* | 9/2010 | Merkel ................ B01D 46/2418 210/510.1 |
| 2012/0297830 A1 | 11/2012 | Backhaus-Ricoult et al. |
| 2012/0316053 A1 | 12/2012 | Francy et al. |
| 2013/0011862 A1 | 1/2013 | Rodriguez et al. |
| 2013/0210608 A1 | 8/2013 | Merkel et al. |

OTHER PUBLICATIONS

International Search Report, issued in connection with corresponding PCT application No. PCT/US2015/030509, Aug. 13, 2015.

* cited by examiner

100 MICRONS

FIG. 4

50 MICRONS

20 MICRONS

FIG. 8

10 MICRONS

ISOLATED PSEUDOBROOKITE PHASE COMPOSITES AND METHODS OF MAKING

This application claims the benefit of priority under 35 U.S.C. §119 of U.S. Provisional Application Ser. No. 62/005,023 filed on May 30, 2014 the content of which is relied upon and incorporated herein by reference in its entirety.

The entire disclosure of publications, patents, and patent documents mentioned herein are incorporated by reference.

BACKGROUND

The disclosure relates to a pseudobrookite structured refractory composite.

SUMMARY

In embodiments, the disclosure provides a composition and method of making a pseudobrookite phase refractory composite having phases containing pseudobrookite structure, for example, an isolated pseudobrookite phase or a discrete phase having pseudobrookite-like microstructure within a continuous second phase.

BRIEF DESCRIPTION OF THE DRAWINGS

In embodiments of the disclosure.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

DEFINITIONS

"Pseudobrookite discrete first phase" refers to a discrete phase comprised of a solid solution (or "straight phase") having pseudobrookite-like structure after the batch is fired.

"Continuous second phase" or "interconnected phase" refers to the material surrounding the discrete first phase.

"Sintered refractory ceramic composition" refers to the composite material after firing.

"Refractory source material" refers to the solid solution (or straight phase) of pseudobrookite before the material is fired.

"Filler material" or "filler" refers to smaller particle size material that packs around or surrounds the refractory source material during processing and turns into or becomes part of the continuous second phase.

"Thermal activating" or "thermal activation" and like terms refer to the condition where during firing the temperature is sufficiently high to allow at least some atoms to diffuse within the composite, such as from the discrete phase to the continuous phase.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

Several patents or patent publications mention cordierite composites (see for example, US 20130210608 (aluminum titanate composites), U.S. Pat. No. 8,394,167 (magnesium aluminum titanate composites), and US 2013011862 (aluminum titanate composites)). Other patents or patent publications mention, for example, a method of making magnesium aluminum titanate (U.S. Pat. No. 8,383,534), the use of large glass ceramic or refractory particles, which are put into matrix particles (US 20120316053), and a microcracked ceramic having non-microcracked particles dispersed in the microcracked ceramic (U.S. Pat. No. 7,960,009).

In embodiments, the disclosure provides a method for manufacturing a sintered refractory inorganic nonmetallic (i.e., a ceramic material and not, for example, a discrete metal phase) composite containing an isolated pseudobrookite phase. The composites of the disclosure can be prepared from an initial refractory powder precursor that includes at least one element, for example, magnesium, aluminum, silicon, or mixtures thereof, that can be either mined or prepared by chemical methods.

In embodiments, the initial refractory powder precursors can be appropriately sized by, for example, direct formation methods, or by, for example, crushing, grinding, or milling. In embodiments, the refractory powder precursor material can then be mixed with a chemically suitable filler material. The filler has a particle size smaller than the refractory pseudobrookite phase in resulting green state ceramic product, and the filler has a sufficiently large volume fraction in the mixture to encapsulate the refractory pseudobrookite phase in resulting green state ceramic product.

In embodiments, the mixture can then be heated to temperatures to: thermodynamically activate a reaction between the components of the refractory precursor powder material; and provide sufficient energy to permit at least some diffusion of mobile atoms from the refractory pseudobrookite discrete first phase into the filler or continuous phase surrounding the discrete first phase.

In embodiments, the disclosed method of making permits, for example, Mg atoms in the discrete first phase to diffuse into the continuous second phase.

The filler phase can be or include, for example, cordierite precursors, which result in and provide a low thermal expansion phase having excellent thermo-mechanical properties and performance.

In embodiments, the present disclosure provides a non microcracked ceramic having dispersed particles, such as microcracked particles, non microcracked particles, or both, and which dispersed particles have a pseudobrookite phase structure.

In embodiments, the disclosed ceramic composite compositions provide highly thermal shock resistant ceramic materials having high strength that can be used, for example, in catalytic converter and particle filter applications, such as titania-mullite compositions.

In embodiments, the present disclosure provides a sintered refractory ceramic composition comprising:
a pseudobrookite structured discrete first phase; and
a continuous second phase.

The second continuous phase substantially or fully encapsulates the discrete first phase.

In embodiments, the sintered refractory ceramic composition can comprise an aluminum-magnesium-titanium oxide ceramic.

In embodiments, the pseudobrookite structured discrete first phase can comprise aluminum-magnesium-titanium oxide, and the continuous second phase comprises cordierite, spinel, strontium calcium aluminum silicon oxide, an amorphous phase, for example, composed of or contains glass, or a mixture thereof.

In embodiments, the sintered refractory ceramic composition comprises, for example, from about 50 to 90 wt % of the pseudobrookite structured discrete first phase, and from about 10 to 50 wt % of the continuous second phase. In embodiments, such as in Example 8, the sintered refractory ceramic composition includes a discrete phase of 60 vol % or 65 wt % magnesium aluminum titanium oxide, and a continuous second phase of 37 vol % or 31 wt % cordierite, and other minor oxide phases to balance.

In embodiments, the pseudobrookite structured discrete first phase, the continuous second phase, or both, can have, for example, microcracks, are free of microcracks, or have a combination thereof, that is one phase can be microcracked and the other phase can be free of microcracks.

In embodiments, the continuous second phase can be comprised of, for example, from about 10 to 50 wt % cordierite based on the total weight of the composition.

In embodiments, the disclosure provides a method of making the above mentioned sintered refractory ceramic composition, comprising:
forming a batch mixture comprising: a refractory source material that when fired forms the discrete first phase, that is, the refractory powder precursor when fired transforms into the pseudobrookite structured discrete first phase, and a filler material that when fired forms the continuous second phase, the filler material having a particle size smaller than the refractory source materials and the filler material having a volume fraction of the mixture that is sufficient to encapsulate the refractory source material; and
firing the batch mixture at from 1200 to 1500° C. for from 5 to 20 hours, for example, from 5 to 15 hours, from 10 to 15 hours, and from 10 to 12 hours, including intermediate values and ranges, to form the sintered refractory ceramic composition.

In embodiments, the method can further comprise adding a dopant to the batch mixture in an amount of, for example, from 0.1 to 3 wt %, from 0.05 to 2.5 wt %, from 0.06 to 2.0 wt %, and like amounts, including intermediate values and ranges. The dopant can be selected from, for example, at least one source of: a silicon, iron, lithium, sodium, potassium, calcium, boron, phosphorous, silver, copper, or a combination thereof. The amount of the dopant in mol % can be converted to wt % and can be included in the total wt % of Component A.

In embodiments, the fired refractory ceramic composition can comprise a discrete first phase that can contain for example, for one to four phases, such as two or three phases, in a solid solution, and the solid solution can comprise at least one of magnesium atoms, aluminum atoms, titanium atoms, or a mixture thereof.

In embodiments, the fired refractory ceramic composition comprises a pseudobrookite structured discrete first phase, and a continuous second phase that encapsulates the discrete first phase.

In embodiments, the activated sintered refractory ceramic composition has a chemical potential sufficient to absorb the magnesium atoms, the aluminum atoms, the silicon atoms, or a mixture thereof, from the refractory source material to form a continuous second phase around the resulting pseudobrookite structured discrete first phase.

In embodiments, the refractory source material has a particle size having 95% of the particle diameters less than 20 micrometers (i.e., $D_{95}$ less than 20 microns), and 90% of the particle diameters are greater than 1.4 micrometers (i.e., $D_{90}$ greater than 1.4 microns).

In embodiments, the refractory source material has a particle size having 95% of the particle diameters less than 51 micrometers (i.e., $D_{95}$ less than 51 microns), and 90% of the particle diameters are greater than 5.8 micrometers (i.e., $D_{90}$ greater than 5.8 microns).

In embodiments, the filler material has a particle size having 90% of the particle diameters less than 14 micrometers (i.e., $D_{90}$ less than 14 microns), and 90% of the particle diameters are greater than 3 micrometers (i.e., $D_{90}$ greater than 3 microns). For example, other particle size particle diameters measurements can include: $d_{10}$, 3.08; $d_{20}$, 4.17; $d_{30}$, 5.14; $d_{40}$, 6.06; $d_{50}$, 7.01; $d_{60}$ 8.04; $d_{70}$, 9.24; $d_{80}$, 10.84; $d_{90}$, 13.58; and $d_{95}$, 16.64 micrometers.

In embodiments, the filler material can be selected from, for example, at least one of a talc, a strontium calcium aluminum silicon oxide, or a mixture thereof.

In embodiments, the filler material can sieve through a 325 mesh screen, i.e., the screen passes particles having diameters less than 44 micrometers.

In embodiments, the composition can have a high thermal insulation property of, for example, from 1.5 to 2.5 W/(m*K), and a high thermal shock property of, for example, from 700 to 800° C.

Method of Making

The pre-fired batching stage includes mixing a component A, which is an initial refractory powder precursor that includes at least one element present in, for example, cordierite (magnesium, aluminum, and metalloid silicon), and component B, which is a chemically suited filler material having a particle size smaller than the refractory product and having a large enough volume fraction of the mixture to encapsulate the refractory material in the composite.

The post-fired material includes a component A comprising a pseudobrookite structured discrete first phase, and a component B comprising an interconnected or continuous second phase that surrounds or encapsulates the discrete first phase. Component B can be, for example, cordierite or like materials. The resulting pseudobrookite discrete first phase can optionally be microcracked.

General Preparative Procedure

A batch was prepared including ingredients that provide a source for discrete first phase and a source for the continuous second phase as defined and demonstrated herein.

Component A can include, for example, aluminium, magnesium, titanium, and oxygen atoms sourced from, for example, chemically processed raw materials, such as metallic aluminium, metallic magnesium, and metallic titanium, aluminium oxide, magnesium oxide, titanium oxide, aluminium hydroxide, magnesium hydroxide, metal halides (e.g., titanium dichloride), or combinations thereof, for example, magnesium aluminium oxide, magnesium titanium oxide, aluminum titanium oxide, and magnesium aluminium titantate, or from, for example, natural raw materials, such as bauxite, gibbsite, rutile sands, dolomite, magnesite, brucite, carnallite, olvine, and like materials, and mixtures thereof.

Component B can include, for example, one or more materials selected from an extensive list of raw materials depending on the targeted continuous second phase. Examples of the targeted continuous second phase can include, for example, a refractory strontium calcium aluminosilicate phase obtained by adding a pre-reacted strontium calcium aluminium silicon oxide material (Filler 1), or a reaction formed strontium calcium aluminium silicon oxide material (Filler 5). Other examples of the targeted continuous second phases can include, for example, a natural clay (e.g., bentonite, kaolin, or mixtures) and other compounds (e.g., Fillers 2 and 3), and others targeted cordierite crystalline phase components, such a talc (e.g., Fillers 3 and 6).

In embodiments, a magnesium source can be any compound that contains magnesium, for example, talc, chlorite, forsterite, enstatite, actinolite, serpentine, spinel, sapphirine, or a magnesium oxide forming source, and like compounds or materials, and their calcined products. A magnesium oxide forming source can be, for example, any magnesium source, which upon heating, converts to magnesium oxide (MgO), for example, magnesium oxide, magnesium hydroxide, magnesium carbonate, and like compounds or materials.

In embodiments, an aluminum source can be any compound that contains aluminum, for example, an alumina forming source, kaolin, pyrophyllite, kyanite, mullite, sillimanite, andalusite, magnesium aluminate spinel, sapphirine, chlorite, and like compounds or materials, and their calcined products. An alumina forming source can be, for example, a compound that converts to aluminum oxide ($Al_2O_3$), upon heating, for example, corundum, a transitional alumina such as gamma, theta, chi, or rho alumina; aluminum hydroxide (a.k.a. aluminum trihydrate or Gibbsite), or an aluminum oxide hydroxide, such as boehmite or diaspore.

In embodiments, a silicon source can be any compound that forms silica ($SiO_2$), upon heating. A silicon source or silica source can be, for example, quartz, cristobalite, tridymite, tripoli silica, flint, fused silica, colloidal or other amorphous silica. In embodiments, the silica source can be crystalline silica, such as zeolite, quartz, or cristobalite. In embodiments, the silicon source can be a silica forming source and can be a non-crystalline silica, such as a fused silica or a sol-gel silica, silicone resin, diatomaceous silica, and like materials. In embodiments, the silica forming source can include a compound that forms free silica when heated, for example, silicic acid or a silicon organo-metallic compound.

In embodiments, the cordierite forming inorganic powder batch mixture can include, for example, at least one aluminum silicate source selected from the group consisting of mullite, kyanite, calcined kyanite, sillimanite, calcined sillimanite, andalusite, calcined andalusite, or combinations thereof. In embodiments, the cordierite forming inorganic powder batch mixture can include a kaolin, either raw or calcined, and at least one magnesium source selected from a magnesium aluminate spinel, a magnesium oxide forming source, or both.

In embodiments the magnesium source can be a magnesium aluminate spinel, and can optionally include porogens, extrusion aids, and like process performance enhancing additives.

In embodiments, a batch composition can be shaped into a green body by any known conventional ceramic forming process, for example, extrusion (e.g., Examples 1 to 6), injection molding, slip casting, tape casting, centrifugal casting, pressure casting, dry pressing (e.g., Example 7), and like techniques. In embodiments, extrusion can be accomplished with a plasticized batch using, for example, an hydraulic ram extrusion press, a two stage de-airing single auger extruder, a twin screw mixer with a die assembly attached to the discharge end, and like equipment, or combinations thereof. In the twin screw mixer, the proper screw elements can be selected according to material and other process conditions to generate sufficient pressure to force the batch material through the die. The extruded batch materials can be fired, sintered, and activated using the conditions in Table 1, for example, from 1340 and 1450° C., for from 15 to 20 hrs in a suitable furnace.

EXAMPLES

The following Examples demonstrate making, use, and analysis of the disclosed composites in accordance with the above general procedures. The following Examples also demonstrate an ability to control the composition of the discrete first phase and the continuous second phase.

The refractory precursor Each of the examples used as Component A an aluminum magnesium titanium oxide ceramic powder with a particle size having 95% of the particles that were less than 20 micrometers, and 90% of the particles that were greater than 1.4 micrometers. Metal element molar percentiles were mixed with 52 mol % aluminum, 40 mol % titanium, and 8 mol % magnesium. A target formula that approximates the initial Component A mixtures is, for example, $(3MgTi_2O_5).(10Al_2TiO_5)$.

This ceramic powder material was selected because of the excellent phase solubility of the pseudobrookite magnesium titanate phase ($MgTi_2O_5$) and pseudobrookite titanium dioxide phase ($TiO_2$) in the pseudobrookite aluminum titanate ($Al_2TiO_5$), which permits the formation of a solid solution in the discrete first phase of the composite. These phase solubilities permit some of the magnesium ions, the aluminum ions, some of the dopants, and in certain circumstances the titanium ions, to diffuse or migrate from the discrete first phase into and react with the continuous second phase. The thermomechanical performance of the aluminum titanate and magnesium-aluminum titanate phases in prior art ceramic compositions are known to have excellent thermal shock resistance.

Fillers

Filler 1 A strontium calcium aluminum silicon oxide powder having 95% of the particles less than 16 micrometers, and 90% of the particles greater than 0.71 micrometers.

Filler 2 Bentonite clay having a particle size less than 1 micrometer.

Filler 3 A talc having 90% of the particles less than 14 micrometers, and 90% of the particles greater than 3 micrometers.

Filler 4 A mixture of 40 mol % magnesium hydroxide, 43 mol % kaolin clay, 13 mol % mullite, and 1 mol % yittria.

Filler 5 A mixture of 20 mol % strontium carbonate, 25 mol % alumina, 50 mol % silica, and 2 mol % calcium carbonate.

Porogen

Porogens include, for example, graphite, starch, and mixtures of graphite and starch, and like materials that can be burned out of the composite during processing.

Extrusion Aid

To induce flow during the extrusion process, about 4 wt % (based on the weight of dry components) hyroxypropyl methylcellulose and water were added to the batches (e.g., about 1:5 hyroxypropyl methylcellulose to water weight ratio).

Table 1 provides exemplary ceramic composites of the disclosure. Examples 1 and 2 are representative of disclosed composites that are suitable for use in, for example, auto substrates (catalytic converters). Examples 4 and 5 are representative of disclosed composites suitable for use in, for example, diesel substrates (particle filters). Example 7 is representative of a disclosed composite having high density, for example, a density of 92% of the theoretical density, suitable for use in, for example, refractory kiln furniture, cookware, heating plates, and like materials.

Method of Making Composites

A general procedure for preparing the disclosed composites includes: mixing using the method and the ingredients listed in Table 1 (Components A and B, and other optional ingredients, such as porogen, and extrusion aid). Representative Component A Precursor Ingredients are listed in Table 2.

TABLE 2

| Component A - Precursor Ingredients | Weight % |
|---|---|
| aluminum oxide; Almatis; A16 SG | 42.6 |
| silicon dioxide; Unimin; Imsil A25 | 0.2 |
| titanium dioxide; Dupont; Ti-Pure R101 | 51.1 |
| magnesium hydroxide; Martin Marietta Magnesia Specialties; Magshield UF | 7.0 |

The blended mixture was fired at from 1300 to 1500° C. as indicated in Table 1 for about 10 to 24 hours.

Example 1

The product of Example 1 was composed of a pseudobrookite structured first discrete phase and containing filler 1 in the continuous second phase. After firing, crystalline phases included a magnesium aluminum titanium oxide pseudobrookite structured discrete first phase and a calcium strontium aluminum silicate continuous second phase based on X-ray diffraction analysis. Scanning electron microscopy (FIG. 2) showed an isolated magnesium aluminum titanium oxide discrete first phase surrounded by a calcium strontium aluminum silicate continuous second phase. The continuous second phase is approximately 40% of the material phases. Example 1 had 0.14 mol % iron added to the batch mixture of

TABLE 1

| Example | 1 | Comp. 2[5] | 3 | 4 | 5 | Comp. 6[5] | 7 |
|---|---|---|---|---|---|---|---|
| Component A (wt %) | 60 | 80 | 82.5 | 87.3 | 76 | 80 | 75 |
| Dopant[1] (wt %) (mol %) | Fe[1] (0.08) (0.14) | Fe | Si[1] (0.2) (0.09) | Si (0.2) (0.09) | Si (0.2) (0.09) | Si (0.2) (0.09) | Si (0.2) (0.09) |
| Component B = Filler (wt %) | 40 | 20 | 17.5 | 12.7 | 24 | 20 | 25 |
| Filler # | 1 | 1 | 2 | 5 | 3 | 4 | 3 |
| Firing temperature (° C.) | 1350 | 1350 | 1340 | 1300 | 1300 | 1450 | 1340 |
| Firing time (hours) | 15 | 15 | 20 | 15 | 15 | 15 | 20 |
| Isolated or discrete pseudobrookite phase? | Yes | No | Yes | Yes | Yes | No | Yes |
| 2$^{nd}$ phase (vol %) | 40 | 16 | 23 | 30 | 42 | NA | 42 |
| Porosity (%) | 50[3] | 40[3] | 0 | 54 | 40 | 10 | 8 |
| Porogen (wt %)[2] | None | None | 23 | 33 | 50 | 15 | None |
| Porogen graphite:starch wt ratio | — | — | 1:0 | 1:0 | 3:2 | 4:5 | — |
| Mixing Method[4] | E[4] | E | E | E | E | E | BM[4] |

[1] The amount of dopant is included in the total weight percent of Component A, where "Fe" is Fe$_3$O$_4$ (i.e., FeO•Fe$_2$O$_3$) and "Si" is silicon dioxide.
[2] Superaddition where the sum of component A and component B are 100% and the additional porogen is based on that 100%.
[3] High porosity attributed to insufficient sintering.
[4] E = extrusion with extrusion aid; BM = ball milling.
[5] Comp. # = Comparative Example.

component A. The added iron source material was iron (II, III) oxide, also known as black iron oxide of the formula $Fe_3O_4$ or $FeO.Fe_2O_3$. The powder was 325 mesh. Other suitable iron sources can be used.

Figure 1:
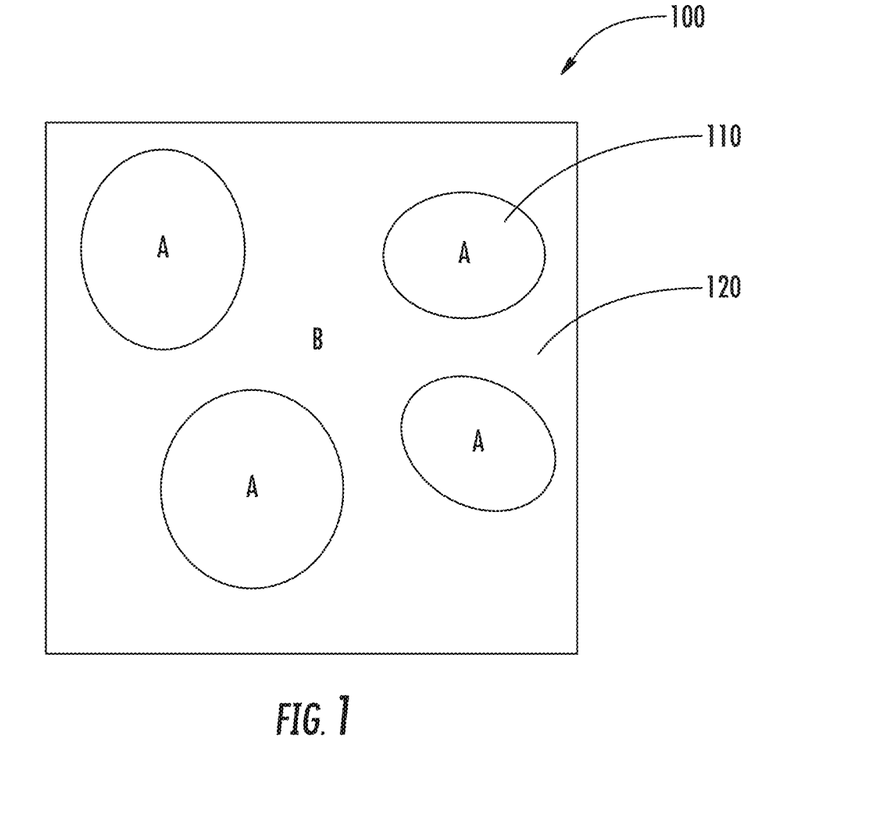
FIG. 1 shows a schematic representation of an exemplary (not to scale) ceramic composite composition of the disclosure having a discrete phase and continuous phase, and as defined herein.
Figure 2:
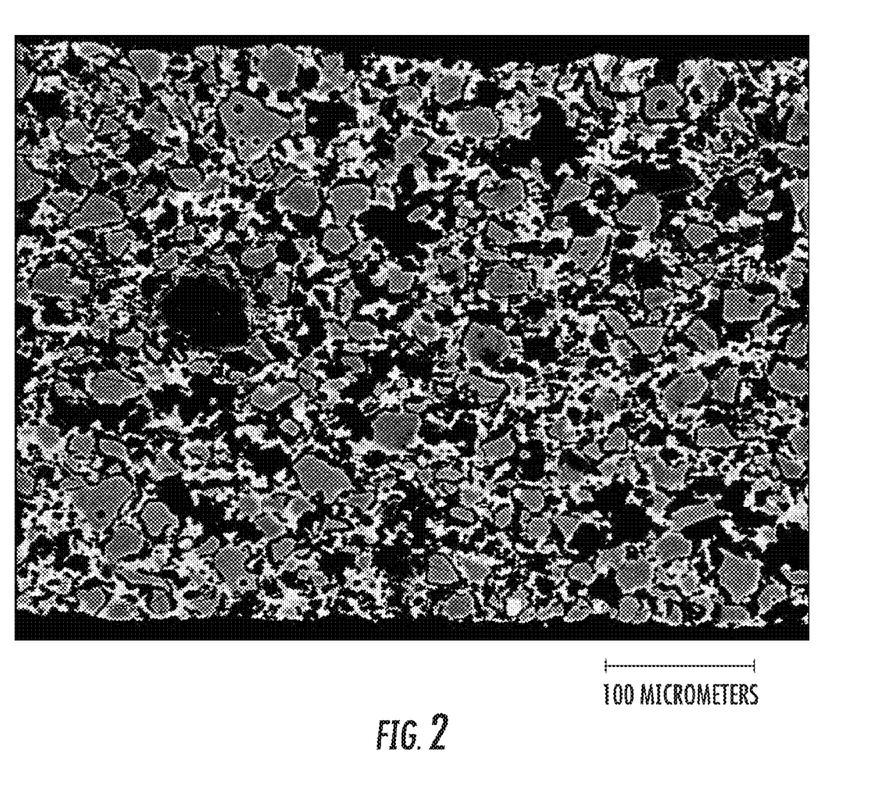
FIGS. 2 to 8 show scanning electron micrographs (SEM) using back scattering electron detectors of selected compositions.

FIG. 2 shows an SEM image and analysis for an inventive composite of Example 1: a magnesium aluminum titanium oxide as the discrete first phase; and a calcium strontium aluminum silicate as the continuous second phase. The SEM image indicated an isolated or discrete magnesium aluminum titanate first phase (i.e., dark grey) surrounded by the silicate continuous second phase (light grey) and pores (dark). Representative components in the pseudobrookite discrete first phase composition of Example 1 and 2 are listed in Table 3.

TABLE 3

| Pseudobrookite discrete first phase ingredients | Weight % |
|---|---|
| aluminum oxide; Almatis; A16 SG | 42.4 |
| silicon dioxide; Unimin; Imsil A25 | 0.2 |
| titanium dioxide; Dupont; Ti-Pure R101/ | 52.1 |
| magnesium hydroxide; Martin Marietta Magnesia Specialties; Magshield UF | 5.0 |
| Iron Oxide-black; Fisher Scientific | 0.3 |

Thermal Analysis Thermal analysis was accomplished with a dilatometer to demonstrate hysteresis during thermal cycling. The thermal expansion of this material when heated from room temperature to 1000° C. followed the curve:

$$y = \text{Intercept} + B1*T + B2*T^2$$

where T is the temperature in ° C. and the expansion is in parts per million (ppm).

| Intercept | 83.52822 |
|---|---|
| B1 | 1.811 |
| B2 | 0.00131 |

The expansion of this material when cooled from 1000° C. room temperature to 50° C. followed the curve:

$$y = \text{Intercept} + B1*T + B2*T^2,$$

| Intercept | −67.40623 |
|---|---|
| B1 | 1.0072 |
| B2 | 0.00214 |

Comparative Example 2

Figure 3:
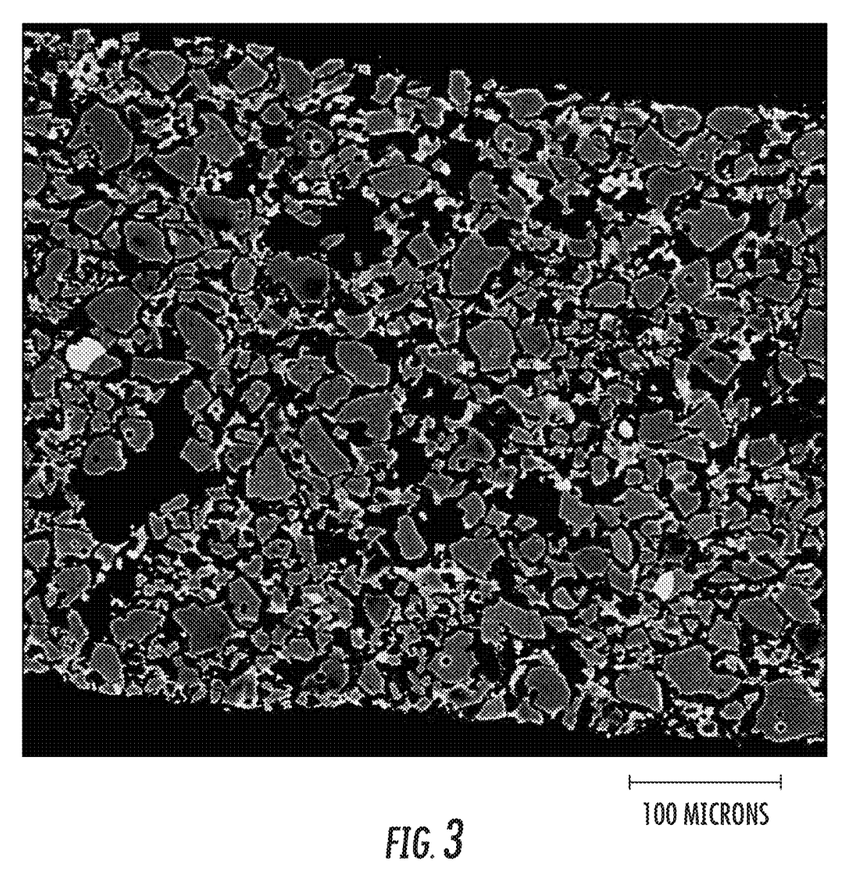

The product of Comparative Example 2 was composed of a pseudobrookite phase containing filler 1. After firing, the crystalline phases included a magnesium aluminum titanium oxide pseudobrookite phase and a calcium strontium aluminum silicate phase based on X-ray diffraction analysis (although not discrete and continuous phases). Scanning electron microscopy showed a magnesium aluminum titanium oxide phase surrounded by the calcium strontium aluminum silicate phase. The surrounding phase was determined to be approximately 20 vol % of the total material phases. Comparative Example 2 had 0.14 mol % iron added to the batch mixture of component A. The added iron material was iron (II, III) oxide, also known as black iron oxide, of the formula $Fe_3O_4$ or $FeO.Fe_2O_3$. The powder was 325 mesh. FIG. 3 shows an SEM image and analysis for another composite having: a magnesium aluminum titanium oxide discrete first phase; and a calcium strontium aluminum silicate continuous second phase. The SEM image of FIG. 3 was similar to the SEM image of FIG. 2 and it was possible to measure the lower amounts of the silicate continuous second phase (light grey), since FIG. 2 had more bright phase than FIG. 3 (component B).

Examples 3 to 7 had 0.09 mol % silicon dopant added to the batch mixture of component A. The added source material in Examples 3 to 7 was a silicon dioxide, also known as silica, $SiO_2$, and the powder was 325 mesh. Other suitable silicon sources can be used.

Thermal Analysis Thermal analysis was accomplished with a dilatometer to demonstrate hysteresis during thermal cycling. The thermal expansion of this material when heated from room temperature to 1000° C. followed the curve:

$$y = \text{Intercept} + B1*T + B2*T^2$$

where T is the temperature in ° C. and the expansion is in parts per million (ppm).

| Intercept | 66.00887 |
|---|---|
| B1 | 0.78099 |
| B2 | 0.00145 |

The expansion of this material when cooled from 1000° C. room temperature to 50° C. followed the curve:

$$y = \text{Intercept} + B1*T + B2*T^2,$$

| Intercept | 0.500008 |
|---|---|
| B1 | −0.77677 |
| B2 | 0.00286 |

Example 3

Figure 4:
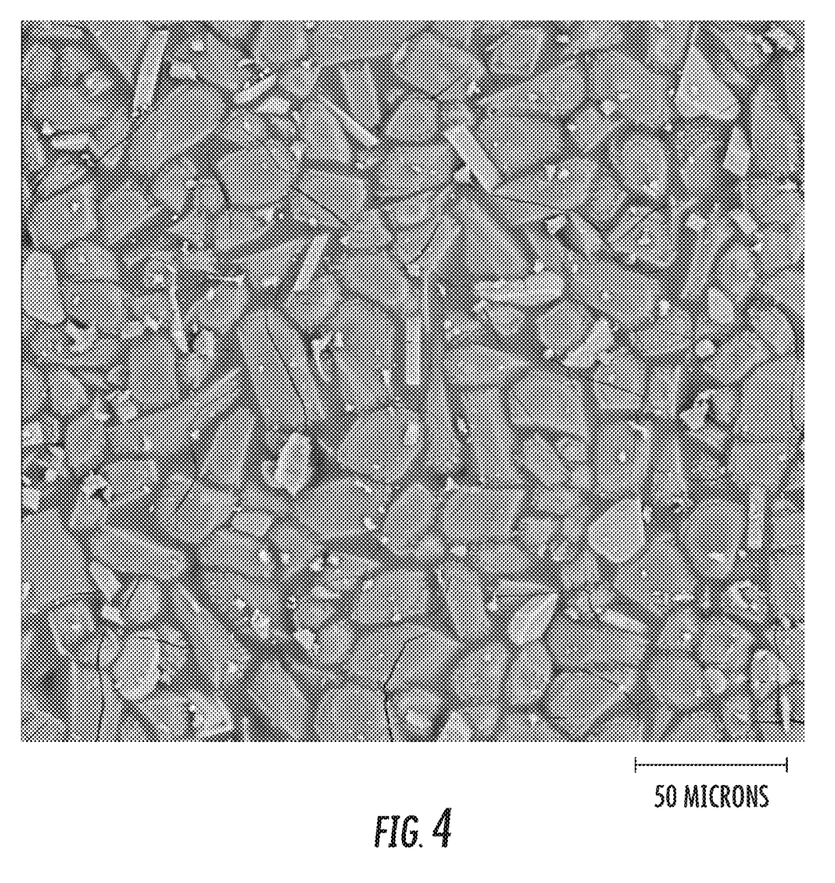

The product of Example 3 was composed of a pseudobrookite structured first discrete phase and a continuous second phase including filler 2. After firing, the crystalline phases included only a magnesium aluminum titanium oxide pseudobrookite structured discrete first phase based on X-ray diffraction analysis. Scanning electron microscopy (FIG. 4) showed an isolated magnesium aluminum titanium oxide surrounded by an amorphous glass continuous phase. The continuous second phase was approximately 18 vol % of the total material phases. FIG. 4 shows the SEM image and analysis for a composite of the magnesium aluminum titanium oxide discrete first phase, and the glass continuous second phase. The image analysis indicated the presence of microcracks in the grains. The microcracks in the grains can be characterized by thermal analysis. Microcracks in the discrete phase of this and other composites can frequently be seen by SEM.

Thermal Analysis Thermal analysis was accomplished with a dilatometer to demonstrate hysteresis during thermal cycling. The thermal expansion of this material when heated from room temperature to 980° C. followed the curve:

$$y = \text{Intercept} + B1*T + B2*T^2 + B3*T^3 + B4*T^4 + B5*T^5 + B6*T^6 + B7*T^7$$

where T is the temperature in ° C. and the expansion is in parts per million (ppm).

| Intercept | 34.55125 |
|---|---|
| B1 | −1.54497 |

| | |
|---|---|
| B2 | 0.00855 |
| B3 | −4.65171E−5 |
| B4 | 1.88358E−7 |
| B5 | −3.78853E−10 |
| B6 | 3.58746E−13 |
| B7 | −1.26746E−16 |

The expansion of this material when cooled from 1000° C. room temperature to 50° C. followed the curve:

$$y=\text{Intercept}+B1*T+B2*T^2+B3*T^3+B4*T^4+B5*T^5+B6*T^6+B7*T^7,$$

| | |
|---|---|
| Intercept | 5.95025 |
| B1 | 0.7159 |
| B2 | −0.03866 |
| B3 | 2.60862E−4 |
| B4 | −8.46243E−7 |
| B5 | 1.38656E−9 |
| B6 | −1.08142E−12 |
| B7 | 3.20628E−16 |

Example 4

Figure 5:
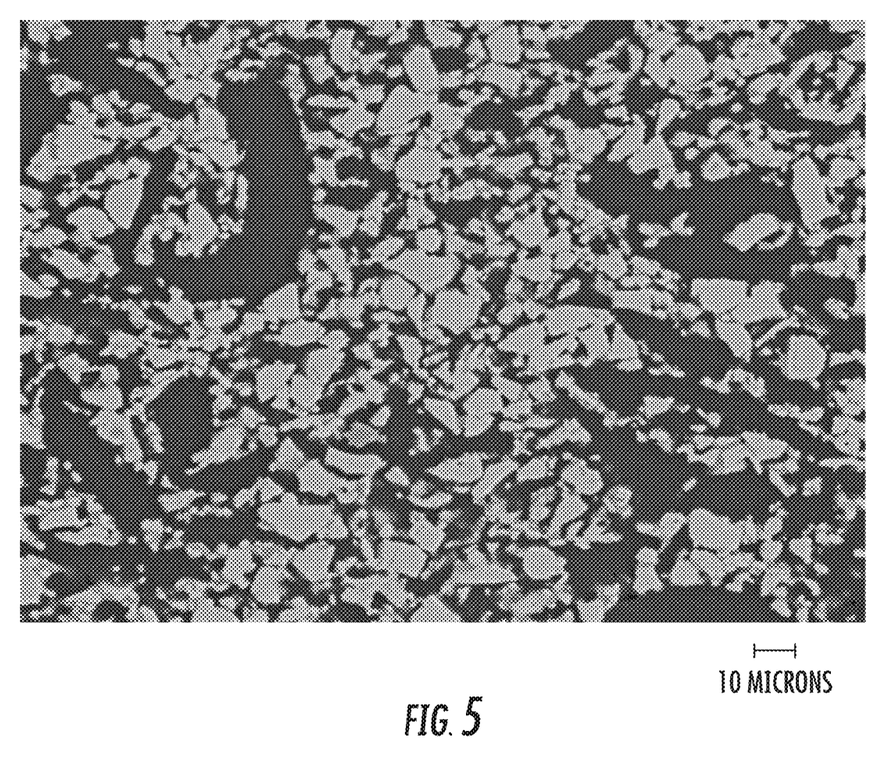

The product of Example 4 was composed of a pseudobrookite structured first discrete phase having a continuous second phase containing filler 3. After firing, the crystalline phases included a magnesium aluminum titanium oxide pseudobrookite structured discrete first phase, a continuous second phase including cordierite, and spinel, based on X-ray diffraction analysis. Scanning electron microscopy (FIG. 5) showed an isolated or discrete magnesium aluminum titanium oxide first phase surrounded by the continuous calcium strontium aluminum silicate second phase. The continuous second phase was approximately 30 vol % of the material phases. FIG. 5 shows an SEM image and analysis for a composite having the magnesium aluminum titanium oxide discrete phase; and the continuous phase having cordierite, and the spinel (i.e., a minor component in the continuous phase). Thermal Analysis The thermal expansion of this material when heated from room temperature to 1000° C. followed the curve:

$$y=\text{Intercept}+B1*T+B2*T2.$$

| | |
|---|---|
| Intercept | −87.2276 |
| B1 | 2.28706 |
| B2 | 0.00186 |

The expansion of this material when cooled from 1000° C. to room temperature to 50° C. followed the curve:

$$y=\text{Intercept}+B1*T+B2*T2+B3*T3+B4*T4+B5*T5+B6*T6+B7*T7.$$

| | |
|---|---|
| Intercept | −23.20962 |
| B1 | 0.29886 |
| B2 | −0.00581 |
| B3 | 9.25811E−5 |
| B4 | −3.59335E−7 |
| B5 | 6.39832E−10 |
| B6 | −5.22497E−13 |
| B7 | 1.59376E−16 |

Example 5

Figure 6:
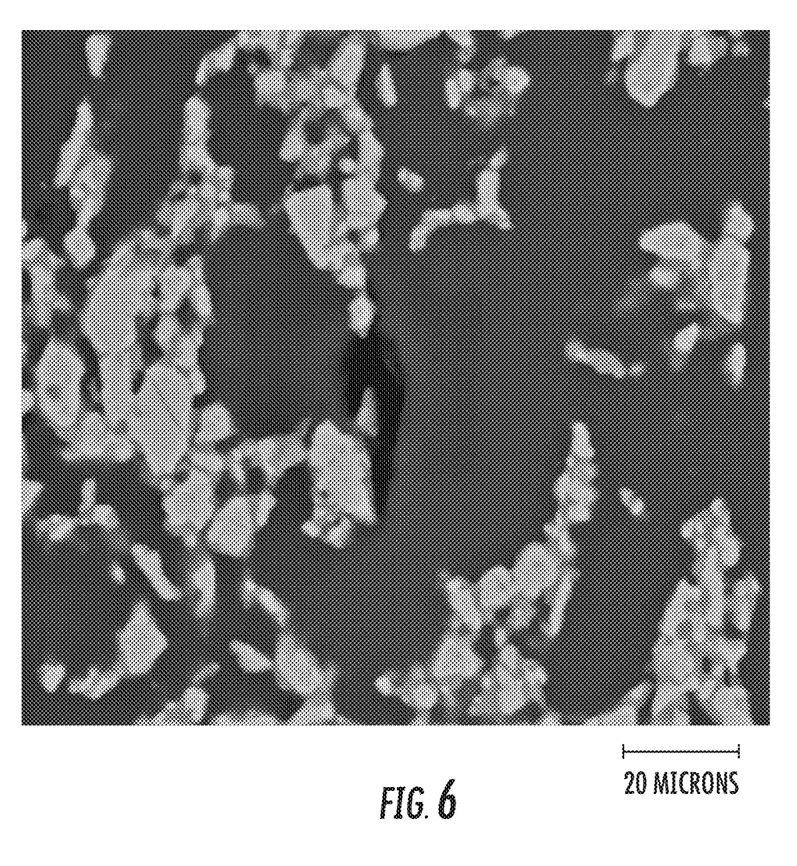

The product of Example 5 was composed of a pseudobrookite structured discrete first phase and a continuous second phase containing filler 3. After firing, the crystalline phases included only a magnesium aluminum titanium oxide pseudobrookite structured first discrete phase, and cordierite and spinel phases based on X-ray diffraction analysis. Scanning electron microscopy (FIG. 6) showed an isolated or discrete first phase of magnesium aluminum titanium oxide surrounded by the continuous second cordierite and spinel phases.

Comparative Example 6

Figure 7:
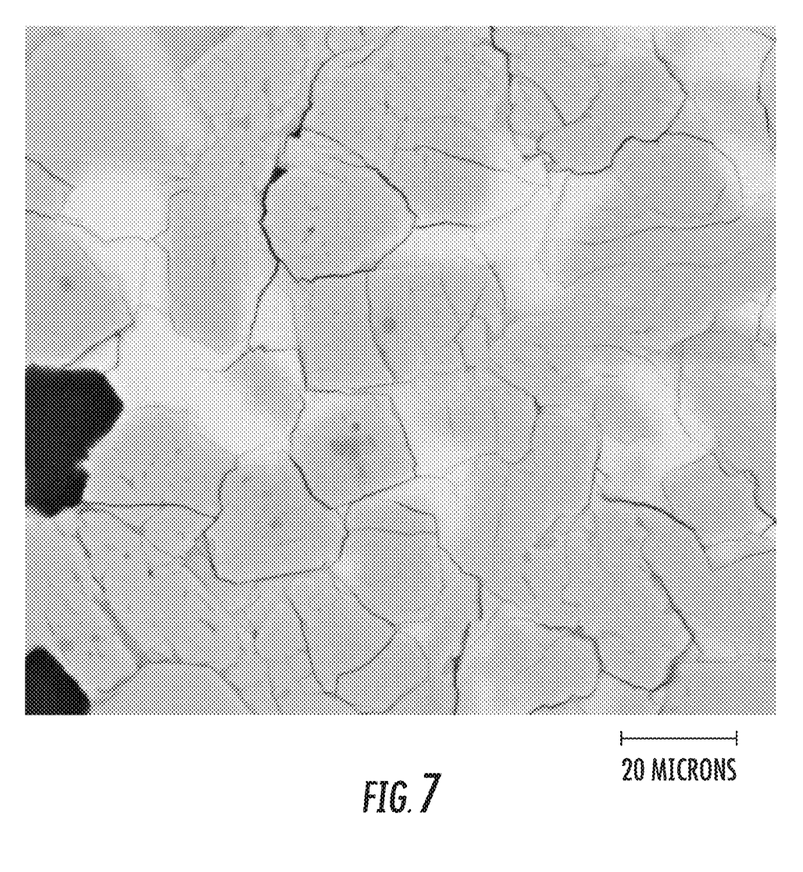

The product of Comparative Example 6 included a pseudobrookite phase containing filler 5 but did not have an isolated or discrete pseudobrookite phase as indicated in Table 1. After firing, crystalline phases included only a magnesium aluminum titanium oxide pseudobrookite structured phase, and cordierite and a spinel phases based on X-ray diffraction analysis. Scanning electron microscopy (FIG. 7) did not show an isolated magnesium aluminum titanium oxide discrete first phase but rather indicated a mixture.

Example 7

The refractory source materials included component A at 75 wt % and component B filler material at 25 wt %. After firing the resulting composite material consisted of 58 vol % of the pseudobrookite discrete first phase and 42 vol % continuous second phase consisting of cordierite, spinel, and amorphous phases.

Figure 8:
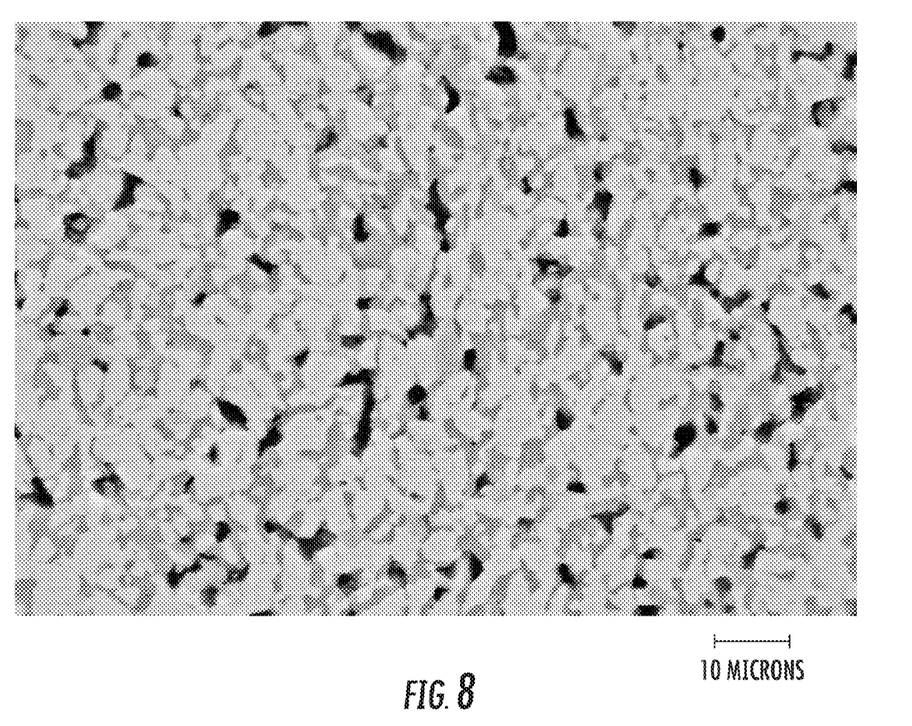

FIG. 8 shows an SEM image and analysis for a composite of a microcracked magnesium aluminum titanium oxide discrete first phase and a continuous substantially non-microcracked second phase of cordierite and spinel. This starting or precursor sample was ball milled, pressed, and fired resulting in a composite having 8 vol % porosity.

Thermal Analysis The thermal expansion of this material when heated from room temperature to 1000° C. followed the curve:

$$y=\text{Intercept}+B1*T+B2*T2.$$

| | |
|---|---|
| Intercept | −38.51564 |
| B1 | 1.2335 |
| B2 | 0.0019 |

The expansion of this material when cooled from 1000° C. room temperature to 50° C. followed the curve:

$$y=\text{Intercept}+B1*T+B2*T2+B3*T3+B4*T4+B5*T5+B6*T6+B7*T7.$$

| | |
|---|---|
| Intercept | 59.70407 |
| B1 | −2.75869 |
| B2 | 0.00753 |
| B3 | −9.66157E−6 |
| B4 | 4.71496E−8 |
| B5 | −8.25522E−11 |
| B6 | 6.18448E−14 |
| B7 | −1.76011E−17 |

Example 8

Thermal Insulation and Shock Analysis The thermal insulation properties of the disclosed composites were evaluated by first preparing a sample sheet by extrusion of about four inches square by about 2 millimeters thick. The sample sheet was heated with a propane touch directed to the top right quadrant while the sample sheet was held in the opposite corner between the thumb and the forefinger of an evaluator's bare hand. A FLIR imager indicated the torch heated quadrant reached a high temperature of about 1,100° C. surrounded by a gradient of cooler regions or partial bands within the quadrant of about 1000° C. to 400° C. The evaluator's fingers were unable to sense any increase in temperature from the torch heated portion of sample sheet.

The thermal shock properties (i.e., reduction in the mean flexural strength of at least 30%) of the disclosed composite of Example 7 was evaluated by a water quench thermal shock test. Under ASTM standard C1525-02 the thermal shock temperature was 750° C. The sample geometry of the test bars used was 4.2 mm×5.3 mm×40 mm. The thermoconductivity of Example 7 was 2.1 W/(m*K). The higher the porosity of the material the lower the observed thermoconductivity value.

The disclosure has been described with reference to various specific embodiments and techniques. However, it should be understood that many variations and modifications are possible while remaining within the scope of the disclosure.

What is claimed is:

1. A sintered refractory ceramic composition comprising:
    a pseudobrookite structured discrete first phase; and
    a continuous second phase,
wherein the pseudobrookite structured discrete first phase comprises from about 50 to 90 wt %, and the continuous second phase comprises from about 10 to 50 wt %, based on the total weight of the composition.

2. The composition of claim 1 wherein the sintered refractory ceramic composition comprises an aluminum-magnesium-titanium oxide ceramic.

3. The composition of claim 1 wherein the pseudobrookite structured discrete first phase comprises aluminum-magnesium-titanium oxide, and the continuous second phase comprises at least one of: cordierite, spinel, strontium calcium aluminum silicon oxide, an amorphous phase, or a mixture thereof.

4. The composition of claim 1 wherein the pseudobrookite structured discrete first phase, the continuous phase, or both, has microcracks, is free of microcracks, one phase has microcracks and the other phase is free of microcracks, or a combination thereof.

5. The composition of claim 1 wherein the continuous second phase comprises from about 10 to 50 wt % cordierite based on the total weight of the composition.

6. The composition of claim 1 wherein the pseudobrookite structured discrete first phase includes a dopant selected from an iron source in from 0.05 mol % to 2 mol %, a silicon source in from 0.01 mol % to 2 mol %, or a combination thereof.

7. The composition of claim 6 wherein the iron source is of the formula $Fe_3O_4$ or $FeO.Fe_2O_3$, and the silicon source is silicon dioxide.

8. The composition of claim 1 wherein the composition has a high thermal insulation property of from 1.5 to 2.5 W/(m*K), and a high thermal shock property of from 700 to 800° C.

9. A method of making the sintered refractory ceramic composition of claim 1, comprising:
    forming a batch mixture comprising: a refractory source material that when fired forms the discrete first phase, and a filler material that when fired forms the continuous second phase, the filler material having a particle size smaller than the refractory source materials and the filler material having a volume fraction of the mixture that is sufficient to encapsulate the refractory source material; and
    firing the batch mixture at from 1200 to 1500° C. for from 5 to 20 hours to form the sintered refractory ceramic composition.

10. The method of claim 9 further comprising adding a dopant in an amount of from 0.01 to 3 wt % based on the total weight of the batch to the batch mixture, the dopant being selected from at least one compound having atoms of: silicon, iron, lithium, sodium, potassium, calcium, boron, phosphorous, silver, copper, or a combination thereof.

11. The method of claim 9 wherein the fired refractory ceramic composition comprises a pseudobrookite structured discrete first phase, and the continuous second phase encapsulates the discrete first phase.

12. The method of claim 9 wherein the discrete first phase contains from one to four phases in a solid solution, and the solid solution comprises at least one source of magnesium atoms, aluminum atoms, titanium atoms, or a mixture thereof.

13. The method of claim 9 wherein the sintered refractory ceramic composition has a chemical potential sufficient to absorb magnesium atoms, aluminum atoms, silicon atoms, or a mixture thereof, from the refractory source material, to form a continuous second phase around the resulting pseudobrookite structured discrete first phase.

14. The method of claim 9 wherein the refractory source material has a particle size having 95% of the particle diameters less than 20 micrometers, and 90% of the particle diameters are greater than 1.4 micrometers.

15. The method of claim 9 wherein the refractory source material has a particle size having 95% of the particle diameters less than 51 micrometers, and 90% of the particle diameters are greater than 5.8 micrometers.

16. The method of claim 9 wherein the filler material has a particle size having 90% of the particle diameters less than 14 micrometers, and 90% of the particle diameters are greater than 3 micrometers.

17. The method of claim 9 wherein the filler material is selected from at least one of a talc, a strontium calcium aluminum silicon oxide, or a mixture thereof.

18. The method of claim 9 wherein the filler material sieves through a 325 mesh screen.

* * * * *